June 23, 1931.  A. C. HARRISON  1,811,233
AUTOMATIC ANALYZING AND CONTROL SYSTEM AND APPARATUS THEREFOR
Filed July 7, 1924  2 Sheets-Sheet 1
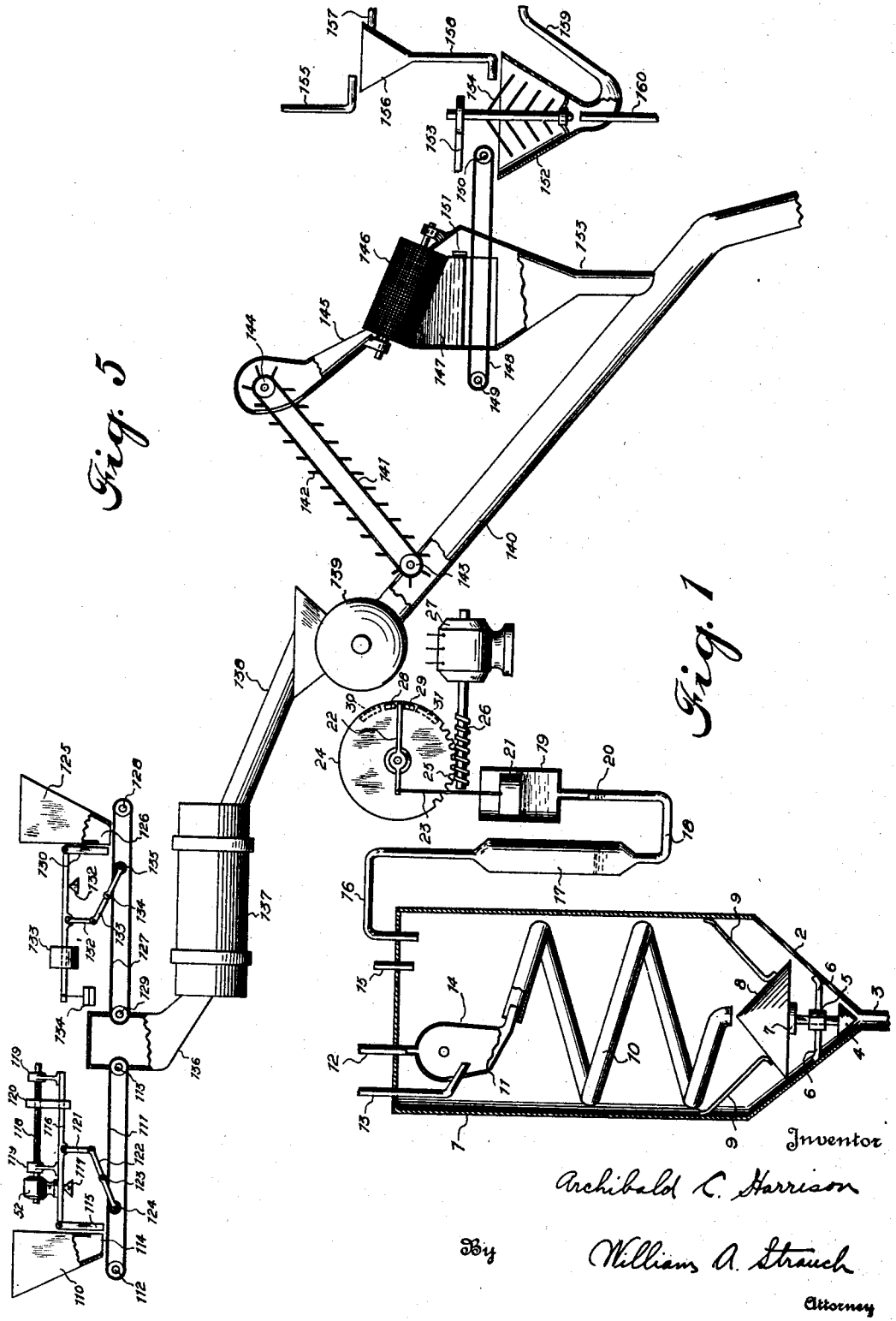

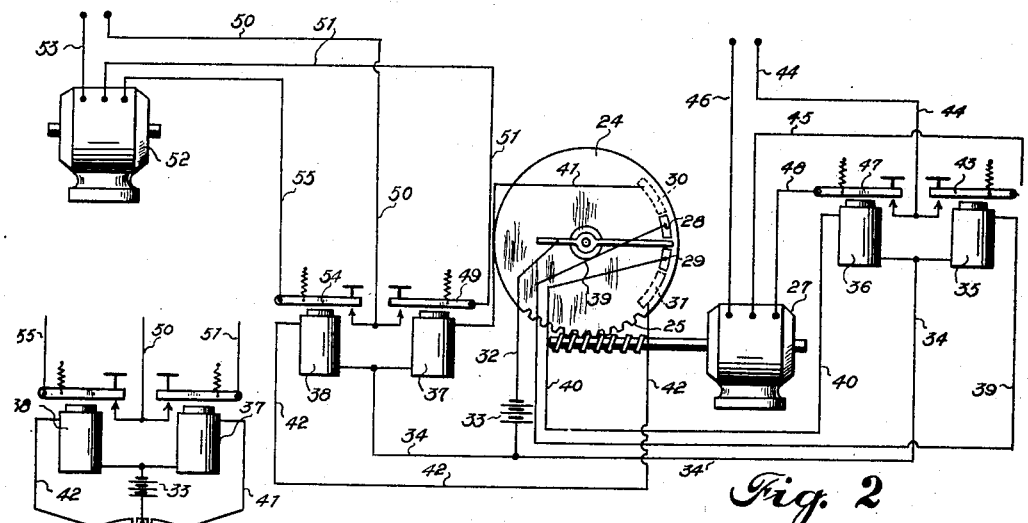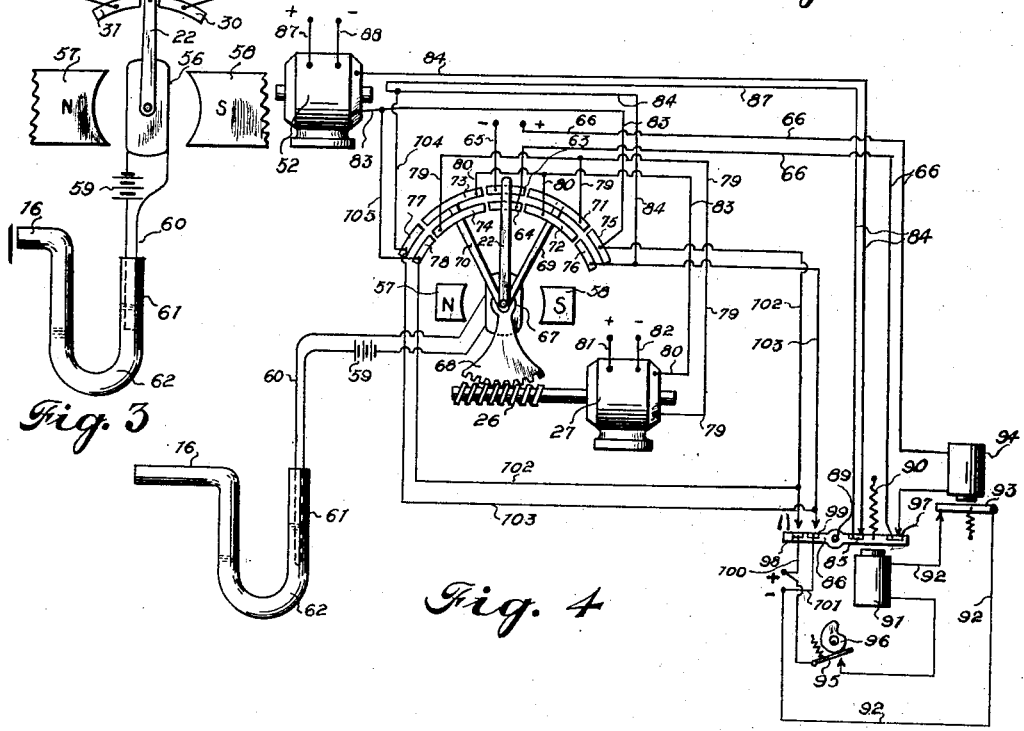

Patented June 23, 1931

1,811,233

UNITED STATES PATENT OFFICE

ARCHIBALD C. HARRISON, OF BIRMINGHAM, ALABAMA, ASSIGNOR TO THE BROWN INSTRUMENT COMPANY, OF PHILADELPHIA, PENNSYLVANIA

AUTOMATIC ANALYZING AND CONTROL SYSTEM AND APPARATUS THEREFOR

Application filed July 7, 1924. Serial No. 724,630.

The present invention relates to automatic analyzing and control systems and apparatus therefor.

More particularly the invention relates to methods of control and apparatus applicable to the analysis and control of the ingredients entering into various processes whereby continuous records of the percentage of certain substances contained in the ingredients may be obtained, or in which the percentage of certain substances may be automatically held to a constant predetermined value within practical operating limits; or in which a record and the automatic control of the contents entering into the process may be simultaneously attained.

The fundamental concept of the invention comprises the generation of a gas or gases by a reaction of a substance or substances to be measured or controlled, or both, with a known chemically active substance which will react therewith to evolve a gas in accordance with fixed chemical laws. The gas evolved is utilized to effect the necessary controls, and depends upon four quantities; namely, pressure, volume, and temperature of the evolved gases, and the rate of bringing together the reacting materials. By holding any three of these quantities at constant values, the variations in the fourth may be utilized for control and record purposes. In the disclosure of the preferred embodiments hereinafter set forth, the temperature and volume of the evolved gases, and the rate of bringing together the reacting materials are held constant; while the pressure variations are relied upon to effect the control, but it will be plain to those skilled in the art any one of the other quantities enumerated may be permitted to vary to effect the control.

The invention is applicable to a wide range of processes. In fact it is applicable to any process involving a constituent substance capable of generating a gas or gases in determinable manner when brought into contact with any other substance or substances, whether the last mentioned substances enter into the process or not. For example, the invention may be applied to control the manufacture of Portland cement by either dry or wet processes; the manufacture of sulphuric, nitric, hydrochloric and other acids or acid solutions; the manufacture of soda, potash, chlorine, ammonia, fertilizers, cyanides, alkalies, and many other uses. In any case where the constituent which it is desired to record or control is capable of evolving any kind of a gas according to a definite law or laws when treated with known substances, to control may be applied.

By the use of the present invention, it is possible to automatically regulate any of the processes to which the invention may be applied in a manner to produce a commercially uniform and higher grade product than has been heretofore obtainable.

An object of the invention is the provision of methods and apparatus for automatically controlling a wide range of processes.

Another object of the invention is the provision of novel methods and apparatus for the mechanical performance of chemical analyses.

Further objects of the invention are the provision of novel sampling arrangements; the provision of novel control arrangements; the provision of novel subcombinations of apparatus useful in relations independently of those hereinafter set forth; and such other objects as may be attained by the utilization of the various steps, sub-combinations, and principles hereinafter set forth in the description of preferred embodiments, and defined in the appended claims in the various relations to which they are adaptable by those skilled in the art.

Referring to the drawings—

Fig. 1 is a sectional more or less diagrammatic view showing the essential details of one type of mechanical analyzer operating one form of control.

Fig. 2 is a diagrammatic disclosure of one form of circuit which may be controlled by the arrangement of Fig. 1.

Fig. 3 is a diagram of a control arrangement for processes in which the response to the control is quick.

Fig. 4 is a diagram of a control arrangement for processes in which the response to the control is slow.

Fig. 5 is a diagrammatic disclosure partially in section showing the essential elements of a sampling and control arrangement for processes handling solid substances, such for example as the manufacture of Portland cement by a dry process.

Analyzer structure and operation

The analyzer shown in Fig. 1 comprises an inclosed chamber 1 with a funnel shaped bottom 2 provided with an outlet 3. A valve 4 for outlet 3 is supported on a spindle which is slidably guided in support 5. Support 5 is held in place by means of suitable brackets 6. Secured to the upper end of the spindle is a float 7. Covering float 7 is a conical hood 8 supported from chamber 1 by means of suitable strips or brackets 9. A spiral trough 10 is secured in chamber 1 in any suitable manner, with its lower end directly over the apex of hood 8, and its upper end communicating with the discharge opening of mixing chamber 11. Chamber 11 is secured in the upper part of chamber 1 and is provided with inlet tubes 12 and 13 for the admission of the materials to be mixed. Suitable openings 14 for the escape of gases from trough 10 and chamber 11 are provided. An orifice 15 for the escape of gases at predetermined rates for differing pressures, is provided. The end of control tube 16 extends into chamber 1 and the pressure variations in chamber 1 are transmitted through this tube to control suitable apparatus.

In operation the material to be analyzed is passed into the chamber 11 preferably at a uniform rate through one of the inlet tubes 12 or 13. Through the other of the inlet tubes 12 or 13 a known substance or reagent which will react with the substance to be analyzed is passed at a predetermined rate in a manner to cause the evolution of a gas or gases in definitely determinable manner, and substantially in some definite relation to the proportions of the substance being analyzed. Compensation for temperature variations is preferably made by using any well known form of device for automatically varying the resistance of orifice 15, or the same effect may be attained by maintaining a predetermined temperature of chamber 1 in any convenient manner. The quantity of materials passed into the chamber 11 is so regulated, and the relative proportions of materials and parts of the analyzer are so chosen that the gas evolving activity of the substance being analyzed is substantially spent during the travel of the mixed materials downward through spiral trough 10. Until a predetermined level of spent materials accumulates in the bottom of chamber 1, valve 4 will seal opening 3 and prevent the discharge of the spent materials. When the level is sufficiently high, float 7 will raise valve 4 and permit the discharge to proceed until the level drops sufficiently to permit valve 4 to close. It will be obvious that the spent product of reacting materials must be in liquid form to operate the valve. When both materials are solids a solution of at least one, or if insoluble, a pulverized mixture of one or both with a liquid, preferably water, may be prepared. Sufficient liquid to cause effective operation should be added and uniformity of mixture may be obtained by the use of suitable mixture tanks containing agitators or stirrers. Preferably all solids are introduced by this method and fed into tubes 12 and 13 at uniform rates from constant level tanks. This method of preparation is more fully set forth hereinafter in connection with the description of Fig. 4.

The quanity of gases generated in the manner above set forth will be proportional to the quantity of substance sought in the material being treated. As the generated gas is permitted to escape through fixed orifice 15, the pressure in tube 16 will be proportional to the percentage of the substance being sought or measured.

Where it is desired to analyze for more than one constituent material of a process, a plurality of the analyzers may be utilized and in each the proper reacting materials to evolve the gases may be chosen.

Recording and control

The pressure variations in tubes 16 of the analyzers may be utilized in many ways. Well known forms of gas operated recording thermometer structures may be utilized to make a continuous record of the pressure variations and the records so made may be calibrated to give direct percentage or quantity readings of the amount of the sought after constituent. Any form of gas operated recorder may be so controlled. With a Bourdon tube connection, the needle of known contacting galvanometer recording or control arrangement may be actuated. The pressure variations may be utilized to vary the electrical resistance of a galvanometer circuit in any contacting galvonometer control or recorder system, as for example, in the well known balancing potentiometer recorders. Such automatic recording and control systems for the operation of valves, motors, switches, rheostats and various mechanisms are well known, certain forms being set forth in U. S. Patents 713,258; 965,824; 1,125,699, and other patents, and are in wide commercial use.

In applying the invention to the control of continuous processes of the classes hereinbefore mentioned, a representative sample or part of the material to be controlled is withdrawn from the main process and passed through the analyzer or analyzers as above set forth. When the sampled ingredients show the proper proportions, a predetermined and uniform pressure will exist in the analyzer at which the control apparatus will be in a position of rest. When any variation in pressure occurs in the analyzer it will be due to a change in the desired proportions in the main process. The control arrangements above enumerated are unbalanced and are set into operation in accordance with the unbalance, and cause the operation of suitable valves, motors, rheostats, weights, switches and the like, to control the relations in the main process in a manner to restore the balance. Where liquids are to be controlled, valves are regulated in a suitable manner to vary the flow of the proper constituents in the main process; where solids are utilized, weights may be shifted to vary the relative quantities thereof; where the change may be effected by furnace temperature adjustment, fuel valves or circuit makes may be actuated.

Referring to Figures 1 and 2, a novel form of motor control is provided which may be used to regulate valves or shift weights in response to pressure variations in the analyzer, and which is adaptable to processes in which an appreciable time elapses from the operation of the motors and the time when the changed proportions pass through the analyzer. In this form, tube 16 connects with a liquid reservoir 17 (Fig. 1), the bottom of which is connected by means of a tube 18 to a float chamber 19. The level of liquid 20 in chamber 19 varies with the pressure in tube 16 in obvious manner. A float 21 resting on the surface of liquid 20 is linked to a pivotally mounted arm 2 by means of a suitable connection 23. A disc 24 is mounted for rotation about the axis of rotation of arm 22, but is movable independently of the movement of arm 22. A set of teeth 25 is cut into the periphery of disc 24 and mesh with a drive worm 26 which in turn is driven by a well known type of reversible motor 27. Supported on disc 24 are contacts 28 and 29 which are arranged to be engaged by arm 22 when the level of liquid 20 shifts in response to pressure variations in chamber 1. Contacts 30 and 31 are secured to fixed supports (not shown) adjacent to disc 24 and in a position to be engaged respectively by contacts 28 and 29 when disc 24 is rotated by motor 27. Arm 22 (Fig. 2) is connected by conductor 32 to one terminal of battery 33. The other terminal of battery 33 is connected by a conductor 34 to terminals of electro-magnetic switches or relays 35, 36, 37 and 38. The remaining terminals of these relays are connected respectively by conductors 39, 40, 41 and 42, to contacts 28, 29, 30 and 31. Relay 35, when energized, through its armature 43 closes a circuit from conductor 44 of a power line, through its front contact, conductor 45 through the motor 27 to the other power supply conductor 46, causing motor 27 to rotate disc 24 in counter-clockwise direction. Relay 36 when energized, through its armature 47 closes a circuit from supply conductor 44, conductor 48, motor 27 and conductor 46, causing motor 27 to rotate disc 24 in a clockwise direction. Relay 37, when energized, closes a circuit through its armature 49 from line conductor 50, conductor 51, motor 52, and line conductor 53, causing rotation of motor 52 in one direction. Relay 38 controls a circuit through its armature 54 from line conductor 50, conductor 55, motor 52, and line conductor 53, causing a reverse rotation of motor 52. Motor 52 may drive a valve, or weight shifting arrangement or the like.

With the parts in the position shown in Figures 1 and 2, the system is balanced and no movement of the motors occurs. The flow of materials in the process being controlled will continue at uniform rates until a change in the proportion of the substance being controlled or regulated occurs. This change may occur due to lack of uniformity in quality of the materials in the main process, or for other reasons. As soon as a material change occurs in the sampled portion passing through the analyzer, the pressure in chamber 1 will change, causing a change in the level of the liquid 20 in the float chamber. This will result in the shifting of arm 22 into engagement with contact 28 or 29 on disc 24. If the pressure decreases, contact 28 will be engaged causing energization of magnet 35 and closing the circuit through armature 43 to motor 27. Motor 27 will now rotate disc 24 counter-clockwise, carrying contact 28 into engagement with contact 30, and completing the circuit to energize magnet 37. Energization of magnet 37 closes the circuit for motor 52 causing rotation in a direction to increase the percentage of the controlled substance. The rotation of motor 27 will continue until the contact 28 is disengaged from arm 22, breaking the circuits of magnets 35 and 37. Magnets 35 and 37 will then de-energize opening the circuits of motors 27 and 52 and stopping the rotation thereof. The proportions of the material in the main process will now be changed, but until the changed proportions reach the analyzer, contact 28 will engage contact 30. Now as the change becomes effective, arm 22 will drop as the float rises due to the increased analyzer pressure and will engage contact 29. This completes the circuit for magnet or switch 36 which will energize and close the reversing circuit through its armature 47 for motor 27 causing disc 24 to rotate clockwise. This rotation of motor 27 will continue while motor 52 remains at rest until arm 22 passes the balancing or zero position due to an increase in the proportion of the controlled substance over the desired amount. When this occurs disc 24 will be rotated to the position where contact 29 will engage fixed contact 31 causing energization of magnet 38 and a reversal of rotation of motor 52. The reverse operation of motor 52 will continue until contact 29 is disengaged from arm 22 and will decrease the proportion of the controlled substance causing an upward movement of arm 22. It will be noted that a step by step rotation will be caused in motor 52 and the length of the steps or intervals of rotation will vary with the deflection of arm 22 from the balanced or zero position. The amount of correction in proportions caused by motor 52 will accordingly vary with the amount of deviation in pressure from the value indicating the presence of the desired proportions. By causing each step to apply a correction in proportions sufficient to bring the arm 22 back to the zero position, the desired relative proportions of the chemically active substances may be closely maintained. In practice for most processes, it is found that commercial materials vary sufficiently in quality so that this relation of correction cannot be maintained. It is, however, possible in all cases to correct slightly more than the desired amount to allow for variations in quality of the materials so that a continual hunting motion will be set up, the limits of which are well within the permissible variation of commercial finished products of the processes. In all cases a more uniform and higher grade finished product than has heretofore been possible may be automatically attained.

Although relays have been indicated to control the motor circuits, it will be understood that any well known arrangement of electro-magnetic switches may be utilized, or for small motors, the circuits may be made directly by arm 22 without the utilization of relaying apparatus. It will also be understood that arm 22 may be actuated by a Bourdon tube connected to tube 16, or by a galvanometer arrangement controlled by the pressure variations in tube 16, and that various forms of reversing motors are adaptable for use in the system.

In processes where the response in the analyzer to changed proportions is rapid, as in the case of mixing liquids, a simplified control arrangement may be utilized. Such an arrangement is shown in Fig. 3. The motor 27 and rotating disc 24 are eliminated and magnets or switches 37 and 38 control motor 52 in the manner above set forth to regulate the proportions of the materials in the main process. Fixed contacts 30 and 31 are adapted to be engaged by arm 22 which will complete circuits from battery 33 to relay 37 or 38 depending upon whether contact 30 or 31 is engaged. Arm 22 may be actuated in any convenient manner by the pressure variations in the analyzer. As shown, arm 22 is secured to a pivotally movable coil 56 of a galvanometer and is arranged for movement between the magnetic poles 57 and 58. The coil 56 may be actuated by a spring tending to throw arm 22 to one side or the other. An energizing circuit for coil 56 includes a battery and a high resistance conductor 60 which may dip in a loop into a tube 61 partially filled with mercury 62. The other end of tube 61 is connected to tube 16 of the analyzer. In operation, when a balanced condition exists, the mercury 60 is at a level where the resistance of the galvanometer circuit is such as will cause sufficient current to flow to hold arm 22 centrally between contacts 30 and 31 against the spring tension. A decrease in pressure in the analyzer will cause the level of mercury in 61 to drop, increasing the resistance of the galvanometer circuit and causing a decrease of current. Arm 22 will then move under the influence of the coil spring into engagement with contact 30 causing energization of magnet 37 and a corresponding rotation of motor 52 to increase the proportion of the controlled substance. Motor 52 will continue to rotate until arm 22 is returned to the balanced or zero position. As in this form the response in the analyzer to changed proportions is rapid, when the proper proportions are restored arm 22 will be positioned between contacts 30 and 31. In similar manner, when the proportion of the controlled substance becomes too great the mercury will rise in tube 61, decreasing the resistance and increasing the current flow in the galvanometer circuit. Arm 22 will then engage contact 31 and cause energization of magnet 38 which will cause rotation of motor 52 to decrease the proportion of the controlled substance. It will be seen that as soon as any deviation from the proper proportion of the controlled substance occurs, motor 52 will be set into operation to restore the proper relative values.

In Fig. 4, a modified form of control is disclosed for utilization where it is desired to establish a definite timing between correcting steps. This form is useful in processes where a comparatively long time elapses between a change of proportions of the materials and the corresponding effect in the analyzer. A timing control is accordingly introduced so that after an adjustment is made, the system will be conditioned for the next adjustment only after a sufficient interval has elapsed to permit the proportions of the preceding adjustment to be passing through the analyzer. Arm 22 is secured to coil 56 and actuated by the galvanometer arrangement as set forth in connection with Fig. 3, although the float arrangement of Fig. 2, or a Bourdon tube arrangement might obviously be utilized.

Secured to arm 22 and properly insulated therefrom, are contacts 63 and 64 to which are secured power supply conductors 65 and 66. Mounted for rotation on the axis of movement of arm 22 but movable independently of arm 22 is a member 67 provided with a toothed rack extension 68 and arms 69 and 70 formed integrally therewith. Worm 26, driven by motor 27, meshes with and drives rack 68 together with arms 69 and 70. Contacts 71 and 72 are secured to arm 69 and insulated therefrom, and contacts 73 and 74 are secured to and properly insulated from arm 70. Contacts 71 and 73 are adapted to engage contact 63, and contacts 72 and 74 are adapted to engage contact 64 when arm 22 is shifted to the right and left respectively. Contacts 75, 76, 77 and 78 are secured to fixed supports and positioned to be engaged by contacts 71 and 72 or 73 and 74 as arms 69 and 70 are rotated to the right and left respectively, by the action of motor 27. Contacts 71 and 74 are connected by conductors 79 to one terminal of the armature winding of motor 27. Contacts 72 and 73 are connected by conductors 80 to the other terminal of motor 27. The field terminals 81 and 82 of motor 27 are permanently connected to a source of electrical energy. Contact 75 is connected directly to one armature terminal of motor 52 by conductor 83; and contact 76 is connected by conductors 84 through contact 85 of an armature 86 to the other armature terminal of motor 52. The field of motor 52 is connected permanently to a supply of electrical energy by leads 87 and 88. Armature 86 is pivotally mounted at 89 and is actuated by a spring 90 and a magnet 91. Magnet 91 is connected by conductor 92 in series through armature 93 of a relay 94, and time switch 95 to the opposite poles of an electrical supply source. A rotating cam 96 or any other suitable means is utilized to periodically close switch 95. Relay 94 is connected in series in line lead 66 through an insulated contact 97 on armature 86. Mounted on armature 86 are insulated contacts 98 and 99, which are connected to the opposite poles of a source of electrical energy by conductors 100 and 101. When magnet 91 is energized, contacts 98 and 99 will apply line potential to contacts 75 and 78 and 76 and 77 through conductors 102 and 103 respectively, and contacts 85 and contacts 97 will be open. Contacts 77 and 78 are connected by conductors 104 and 105 to conductors 84 and 83.

In operation, cam 96 actuates switch 95 to periodically close and interrupt the energizing circuit for magnet 91. With the proportions of materials being controlled in the process at the proper values, arm 22 will be in the zero position shown in Fig. 4. As magnet 91 is energized contacts 85 and 97 will be interrupted and line potential will be applied to conductors 102 and 103 by contacts 98 and 99, but the energizing circuit of motor 52 is open at contact 85 and no operation of that motor can occur in any possible position of arm 22. So long as the arm 22 is in neutral position, motor 27 will not be operated when magnet 91 is energized. When the pressure in the analyzer decreases, arm 22 will shift to the right, causing contacts 63 and 64 to apply line potential to contacts 71 and 72. As soon thereafter as magnet 91 de-energizes, armature 86 will close contacts 85 and 97 and motor 27 will receive armature current from contact 71, conductor 79, the motor armature and conductor 80 to contact 72. Motor 27 will rotate in a direction to move arms 69 and 70 to the right causing contacts 71 and 72 to engage contacts 75 and 76. Energy is now supplied to motor 52 from contact 63, contact 71, contact 75, conductor 83, motor 52, conductor 84, contact 85, conductor 84, contact 76, contact 72 and contact 64. Motor 52 will rotate in a direction to correct the relative proportions of materials in the process, and the rotation of both motors will continue until contacts 71 and 72 are moved out of engagement with contacts 63 and 64 at which time the armature circuits of both motors will be broken. While current flows in conductor 66, relay 94 will be energized and will attract armature 93 to interrupt the energizing circuit of magnet 92 so that the correcting steps will be carried on without interruption by operation of the time control. After the interruption of the motor circuits, relay 94 will de-energize and contacts 71 and 72 will be in engagement with contacts 75 and 76. Upon the next closure of switch 95, magnet 91 will energize interrupting contacts 85 and 97, and closing contacts 98 and 99. A circuit will now be completed from contact 98, conductor 102, contact 75, contact 71, conductor 79, motor 27, conductor 83, contact 72, contact 76, conductor 103, and contact 99. The current direction in this circuit will be such as to reverse the rotation of motor 27, and this rotation will continue until contacts 71 and 72 are disengaged from contacts 75 and 76, when the armature circuit will be broken and the parts will be restored to zero or balanced position ready for the next correction. Time switch 95 is held closed a sufficient time to permit complete restoration of arms 69 and 70 to zero. During the restoring movement motor 52 cannot operate, as its circuit is interrupted at contact 85 when magnet 91 is actuated. If the correction applied by motor 52 was not sufficient, by the time motor 52 has completed the restoring movement and magnet 91 has de-energized, arm 22 will have adjusted itself to the changed proportions, and contacts 63 and 64 will engage contacts 71 and 72 causing a repetition of the cycle above set forth, and further correction will occur. The cycles will be repeated until the proper proportions are restored in the process when arm 22 will return to normal. In a similar manner, if the proportions change so that too much pressure is generated in the analyzer, arm 22 will shift to the left causing contacts 63 and 64 to engage contacts 73 and 74. This will complete an energizing cicuit over conductors 79 and 80 in a direction opposite to that closed over contacts 71 and 72, and motor 27 will rotate arms 69 and 70 to the left causing engagement of contacts 73 and 74 with contacts 77 and 78. A circuit will now be completed over conductors 104 and 105, to 83 and 84, causing motor 52 to rotate in a direction to decrease the proportion of the controlled substance in the process, and to cause a decrease in analyzer pressure. Rotation of motors 52 and 27 will continue until contacts 73 and 74 are disengaged from contacts 63 and 64 when the supply of energy from conductors 65 and 66 will be interrupted. As above set forth, relay 94 will de-energize, permitting switch 95 to cause energization of magnet 91 at the proper time. When magnet 91 energizes, a circuit for motor 27 will be closed from contacts 98 and 99, over conductors 102 and 103, contacts 77, 73, 78 and 74, conductors 79 and 80 to motor 27. Motor 27 will rotate the contacts 73 and 74 to the right until they are disengaged from contacts 77 and 78, interrupting the energizing circuit as traced. If the correction was insufficient to effect the restoration of arm 22 to zero position, the cycles will be repeated until the balance is effected.

It will be noted in this form that the extent of correction will vary with the deflection of arm 22 from the zero position, and will accordingly vary with the degree of deviation from desired proportions in the process. It will also be noted that correction continues in steps until the desired conditions are restored.

*Sampling and regulation of process utilizing solids*

The application of one form of the invention to the control of a process handling solids is shown in Fig. 5. For purposes of illustration the control of carbonates in the manufacture of Portland cement by a dry process will be described. As is well known, the Portland cement may be manufactured by mixing definite proportions of lime stone with shale in a manner to produce a mixture containing as nearly as possible a fixed percentage of calcium carbonate, and treating this mixture to produce the cement. In order to produce a uniform quality of cement, it is highly desirable to maintain a definite percentage or proportion of carbonates in the materials, and this may be accomplished automatically in the following manner.

A feed hopper 110 for crushed shale is arranged over an endless traveling conveyor 111 driven and supported by pulleys or sprockets 112 and 113. A discharge opening 114 is provided in the hopper and the area of the opening is controlled by a gate 115. Gate 115 is connected to and movable with one end of a scale beam 116 which in turn is fulcrumed at 117. Mounted directly over the fulcrum 117 is motor 52, which is arranged to drive a weight adjusting screw 118, rotatably supported in journals 119 from the scale beam 116. A sliding weight 120 is driven by screw 118 in a manner to be shifted to the right or left along the scale beam in accordance with the rotation of motor 52. Connected to the scale beam 116 by a link 121 is a member 122, pivotally mounted on a fixed support 123. Supported on the other end of 122 is a roller 124 over which the endless conveyor belt 111 runs. In operation the weight of the material on the belt 111 moves scale beam 116 upward and gate 115 downward until a balance is established between the weight of material passing continuously over the belt, and the adjustment of weight on the scale beam. A shifting of weight 120 to the left permits gate 115 to lower, reducing the amount of material carried continuously out through opening 114; and movement of the weight to the right raises gate 115 and increases the weight of material passing continuously out of the hopper. A similar hopper 125 with an opening 126, a conveyor bottom 127 mounted on and driven by pulleys 128 and 129, and a control gate 130 is provided for the continuous feeding of carbonates or crushed lime stone. Gate 130 is connected to and actuated by a scale beam 131, fulcrumed at 132 and provided with adjustable weights 133 and 134. Connected to beam 131 by a link 132′ is a member 133. Member 133 is pivotally mounted at 134 and supports a roller 135 over which conveyor 127 moves. In operation the position of gate 130 and accordingly the amount of material passing out of opening 126 on belt 127 is determined by the weight of the material and the setting weights on the beam. For each setting of the weights, the gate 130 will assume a definite position and a balanced condition will be established until either the adjustments of weights 133 and 134 are changed manually, or the density of the material on the belt changes.

By the arrangements set forth, for a given setting of the weights; crushed shale from hopper 110 and crushed limestone from hopper 125 will be fed into the conveyor 136 at a substantially uniform and controlled rate. From conveyor 136 the mixed shale and limestone pass through a dryer 137 of any well known construction. From the dryer, the materials pass through conveyor 138 into grinder 139 and the ground materials are then discharged into conveyor 140. A small sampling conveyor belt or chain 141, provided with flights 142 is supported on and driven by sprockets or pulleys 143 and 144 in a manner to dip into the ground materials passing through conveyor 140 and picks up small amounts thereof in the flight pockets. The material in the flight pockets is discharged into a feed hopper 145 and then passes into a continuously rotating screen 146. The fine particles sift through screen 146 and pass down an inclined plane 147. At the bottom of the plane 147 the screened material is caught on an endless traveling conveyor belt 148 supported on and driven by pulleys 149 and 150. Positioned at the right end of the inclined plane 147 is an adjustable control member or gate 151, the lower edge of which levels off the material on belt 148 and determines the amount which may be carried to the right and discharged into tank 152. In this manner fine sifted material is passed continuously into tank 152 at a uniform rate. The surplus material scraped off belt 148 by the action of gate 151, and the coarse material which passes through the center of the screen 146 drops into hopper or casing 153 and are returned to conveyor 140 passing on to the kilns. Rotatably supported in tank 152 and driven by a belt 153 is an agitator or stirrer 154. Water from a pipe 155 is continuously fed into a constant level tank 156 provided with an overflow outlet pipe 157. A discharge pipe 158 feeds water at a constant rate into tank 152, due to the constant level which is maintained in tank 155. Tank 152 is provided with an overflow outlet 159 which maintains a constant level in tank 152. Stirrer 154 thoroughly mixes the material from conveyor 148 with the water and maintains the contents of 152 in a constant state of agitation. A uniform and continuous flow of the mixture of water and fine materials is withdrawn from tank 152 through tube 160 and is introduced into the analyzer through tube 13. A uniform flow of any proper acid is introduced into the analyzer through 12, mixing with the material introduced through tube 13 and causing the evolution of gases. The motor 52 is controlled by pressure variations in the analyzer as above set forth, and positions weight 120 along beam 116 in a manner to maintain the percentage of $CaCO_3$ in the material passing into the kilns at a substantially constant value by increasing or decreasing the amount of shale fed from hopper 110 while the limestone is fed at a uniform rate.

If desired, the feed of the limestone may be varied, and the feed of shale held constant, or by the addition of a motor for shifting weight 133, the feed from each hopper may be simultaneously varied. It will also be apparent that any suitable automatic feed arrangement may be substituted for the arrangements shown. Such devices ordinarily vary with the material to be handled, and the method of applying the present invention to the various known arrangements will be apparent to those skilled in the art. It is to be understood that the invention is not limited to the diagrammatic arrangements shown and that the disclosures are illustrated of forms of the invention which may be varied widely without departing from the spirit of the invention as defined by the terms of the appended claims.

Subject matter of invention disclosed but not claimed in the present application, is disclosed and claimed in my co-pending application, Serial No. 233,727, filed November 16, 1927, for Control methods and apparatus.

Having described preferred embodiments of the invention, what is desired to be secured by Letters Patent and claimed as new is:

1. In a process for treating materials, comprising a constituent or constituents which may be treated in a manner to cause the evolution of a gas or gases, the method of determining the amount of said constituent or constituents which comprises the steps of continuously treating a chemical sample of the materials to cause said constituent or constituents to evolve gases in predetermined manner and controlling suitable apparatus by the variations in a physical characteristic of the evolved gases.

2. The method of controlling processes of treating materials embodying substances capable of reacting to cause evolution of gases, which comprises treating chemical samples of the materials to cause the evolution of gases in accordance with the proportions of the said substances contained therein, and varying the relative proportions of the substances in the material under the control of the variations in a physical characteristic of the evolved gases.

3. In a process for treating materials, comprising a constituent or constituents which may be treated in a manner to cause the evolution of a gas or gases, the method of controlling the amount of said constituent or constituents which comprises continuously treating a chemical sample of the materials to cause the evolution of gases from said constituent or constituents contained therein, and varying the proportions of the constituents in the material under the control of the variations in a physical characteristic of the evolved gases.

4. The method of analyzing materials containing constituents capable of entering into gas evolving reactions with known substances in determinable manner which comprises the steps of treating chemical samples of the materials to be analyzed with suitable reacting substances to evolve gases in predetermined manner, and operating suitable control apparatus under the control of variations in a physical characteristic of the evolved gases.

5. The method of analyzing materials containing constituents capable of entering into gas evolving reactions with known substances in determinable manner which comprises the steps of treating the materials to be analyzed with suitable reacting substances to evolve gases in predetermined manner, and operating suitable control apparatus under the control of variations in a physical characteristic of the evolved gases.

6. A process which comprises the steps of continuously treating in predetermined manner a material containing a substances of unknown proportions with a known substance which will react chemically therewith, to evolve gases in known manner, and operating suitable control apparatus under the control of variations in a physical characteristic of the evolved gases.

7. A method as set forth in claim 6 in which the evolved gases are controlled in a manner to cause pressure variations in accordance with variations in proportion of said first mentioned substance in said materials.

8. A mechanical analyzer comprising gas generating means, means for discharging the gases from said generating means in predetermined manner, and control means operated by the pressure variations in said generating means.

9. In a control system, a gas generator, and control apparatus maintained at rest when gases in said generator are evolved at a predetermined rate; said control apparatus being initiated in operation by substantial deviations from said predetermined rate of evolution of gases to restore the rate of evolution to the predetermined value.

10. In combination, a gas generator; means for feeding materials to said generator in a manner to cause continuous evolution of gases; and means controlled by pressure of the evolved gases for maintaining the rate of evolution of said gases in said generator substantially at a predetermined value.

11. The combination as set forth in claim 10, in which said last mentioned means comprises means for varying the relative proportions of the materials being fed to said gas generator.

12. The combination as set forth in claim 10 in which said last mentioned means comprises automatic switching apparatus, and a reversing motor controlled by said switching apparatus.

13. In combination, means for feeding materials into a main treating apparatus in definite proportions; means for continuously sampling said materials as they pass into said main apparatus; and means for mechanically analyzing said sampled portions to determine the proportion of a constituent part thereof and for automatically controlling said first mentioned means in accordance with the results of said analysis in a manner to maintain substantially uniform proportions of said constituent part of the materials being fed into said main apparatus.

14. The combination as set forth in claim 13 in which said last mentioned means comprises a gas generator in which said sampled portions are treated in a manner to cause the evolution of gases, together with means controlled by said gases for controlling said first mentioned means.

15. The combination as set forth in claim 13 in which said first mentioned means comprises automatic weighing apparatus.

16. In a process for the manufacture of compounds from materials containing constituents capable of reacting with a known substance to evolve gases, the steps of automatically and continuously mixing the materials, continuously withdrawing samples of the mixture and subjecting the same to reactions with said substance to cause evolution of gases; and controlling the mixture in accordance with the evolved gases to maintain predetermined proportions of said constituents therein.

17. A process for the manufacture of cement comprising the steps of automatically mixing limestone and shale, continuously sampling a portion of the mixture and subjecting the same to reactions with a known substance to cause the evolution of gases from the carbonates contained therein; and continuously controlling the mixture through variations in the quantity of the evolved gases in a manner to maintain substantially fixed proportions of the carbonates therein.

18. The method of controlling a process of treating materials which comprises the step of chemically analyzing a portion of materials entering into the process, and controlling the process by the variations in a physical characteristic of one of the products of the chemical analysis.

19. The method of controlling characteristics of a mixture of substances which comprises withdrawing a portion of the mixture, reacting the withdrawn portion with a substance causing the formation of gaseous reaction products, and controlling the mixture of the substances by the variations in a physical characteristic of the gaseous reaction products.

In testimony whereof, I affix my signature.

ARCHIBALD C. HARRISON.